(12) United States Patent
Lee et al.

(10) Patent No.: US 12,313,481 B2
(45) Date of Patent: May 27, 2025

(54) STRETCHABLE STRAIN SENSOR, COMBINATION SENSOR, AND DISPLAY PANEL AND DEVICE

(71) Applicant: Samsung Electronics Co., Ltd., Suwon-si (KR)

(72) Inventors: Gae Hwang Lee, Suwon-si (KR); Youngjun Yun, Suwon-si (KR); Jong Won Chung, Hwaseong-si (KR); Yeongjun Lee, Seongnam-si (KR); Won-Jae Joo, Seongnam-si (KR); Yasutaka Kuzumoto, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/535,479

(22) Filed: Dec. 11, 2023

(65) Prior Publication Data
US 2024/0118149 A1 Apr. 11, 2024

Related U.S. Application Data

(62) Division of application No. 17/339,140, filed on Jun. 4, 2021, now Pat. No. 11,885,700.

(30) Foreign Application Priority Data

Aug. 28, 2020 (KR) .................. 10-2020-0109229

(51) Int. Cl.
G01L 1/24 (2006.01)
G01B 11/16 (2006.01)
G01L 11/02 (2006.01)

(52) U.S. Cl.
CPC .............. *G01L 1/248* (2013.01); *G01B 11/16* (2013.01); *G01L 11/02* (2013.01)

(58) Field of Classification Search
CPC ............ G01J 2005/0077; G01J 5/0022; G01J 5/0025; G01J 5/48; G01J 1/0266;
(Continued)

(56) References Cited

U.S. PATENT DOCUMENTS 5,189,299 A 2/1993 Zimmermann et al.
8,111,953 B2 2/2012 Borgos et al.
(Continued)

FOREIGN PATENT DOCUMENTS

CN 106999060 A 8/2017
CN 107044894 A * 8/2017 ............. G01L 1/247
(Continued)

OTHER PUBLICATIONS

Jimin Gu et al., "Wearable Strain Sensors Using Light Transmittance Change of Carbon Nanotube-Embedded Elastomers with Microcracks" ACS Appl. Mater. Interfaces 2020, 12, 10908-10917.

*Primary Examiner* — Michael P Stafira
(74) *Attorney, Agent, or Firm* — Harness, Dickey & Pierce, P.L.C.

(57) ABSTRACT

A stretchable strain sensor includes a light-emitting element, an optical structure, and a photo-detective element. The stretchable strain sensor is located in a path of light emitted from the light-emitting element. The optical structure is configured to have optical properties that change in response to stretching of at least a portion of the stretchable strain sensor. The photo-detective element is configured to detect light transmitted through the optical structure or reflected through the optical structure.

5 Claims, 20 Drawing Sheets

(58) Field of Classification Search
CPC ...... G01J 1/0411; G01J 1/0414; G01J 1/0422; G01J 1/0448; G01J 1/4228; G01J 2001/4473; G01J 1/4257; G02B 19/0023; G02B 19/0076; G02B 21/06; G02B 23/2423; G02B 6/0005; G02B 6/04; G02B 6/4416; G02B 6/4475; G02B 13/14; G02B 2027/0178; G02B 27/0093; G02B 27/017; G02B 27/0172; G02B 27/14; G02B 27/48; G02B 6/0035; G02B 6/0036; G02B 6/0093; G02B 2027/0125; G02B 2027/0138; G02B 2027/014; G02B 21/00; G02B 21/0012; G02B 21/0032; G02B 21/0076; G02B 21/16; G02B 21/36; G02B 23/2446; G02B 23/2484; G02B 26/00; G02B 27/0018; G02B 27/4205; G02B 27/646; G02B 30/27; G02B 30/29; G02B 6/0028; G02B 6/006; G02B 6/0076; G02B 6/4214; G02B 6/4215; G02B 6/4262; G02B 7/00; G01B 11/00; G01B 9/02091; G01B 11/2518; G01B 9/0201; G01B 9/02038; G01B 9/02082; G01B 9/02087; G01B 2290/45; G01B 2290/70; G01B 9/02002; G01B 9/02004; G01B 9/02011; G01B 9/02028; G01B 9/02083; G01L 1/246

See application file for complete search history.

(56) References Cited

U.S. PATENT DOCUMENTS

| 9,970,832 | B2 | 5/2018 | Hong et al. | |
|---|---|---|---|---|
| 10,209,060 | B1* | 2/2019 | Nguyen | ................ G01B 11/18 |
| 10,746,612 | B2 | 8/2020 | Atashbar et al. | |
| 10,945,663 | B2* | 3/2021 | Bozkurt | ............... G01N 27/048 |
| 11,525,796 | B2 | 12/2022 | Yeo et al. | |
| 2009/0315989 | A1* | 12/2009 | Adelson | ................ G06F 3/042 348/135 |
| 2014/0211195 | A1* | 7/2014 | Barcelo | ................. G01L 1/241 356/32 |
| 2016/0129279 | A1 | 5/2016 | Ferolito | |
| 2016/0239093 | A1* | 8/2016 | Chua | .................... G06F 3/0416 |
| 2017/0176271 | A1 | 6/2017 | Kuo | |
| 2017/0350979 | A1* | 12/2017 | Uyeno | .................. G01S 17/10 |
| 2018/0113036 | A1* | 4/2018 | Uemura | ................. G01B 11/16 |
| 2018/0188125 | A1 | 7/2018 | Park et al. | |
| 2018/0348863 | A1 | 12/2018 | Aimone et al. | |
| 2022/0009764 | A1 | 1/2022 | Zhou et al. | |

FOREIGN PATENT DOCUMENTS

| CN | 108896222 A | | 11/2018 | |
|---|---|---|---|---|
| CN | 108896222 B | * | 6/2020 | ............... G01L 1/24 |
| EP | 3324166 A1 | | 5/2018 | |
| JP | 2017-075847 A | | 4/2017 | |
| KR | 10-2019-0030064 A | | 3/2019 | |
| KR | 10-2019-0036446 A | | 4/2019 | |
| KR | 10-2019-0050165 A | | 5/2019 | |
| TW | I579534 B | * | 4/2017 | |
| WO | WO-2009/155501 A2 | | 12/2009 | |
| WO | WO-2016/123651 A1 | | 8/2016 | |
| WO | WO-2017214582 A1 | * | 12/2017 | ........... A61B 5/1172 |
| WO | WO-2018/037855 A1 | | 3/2018 | |
| WO | WO-2018049004 A1 | * | 3/2018 | ........... C01B 32/184 |
| WO | WO-2018118673 A2 | * | 6/2018 | ............... A61B 5/00 |
| WO | WO-2019/108862 A1 | | 6/2019 | |
| WO | WO-2020127125 A1 | * | 6/2020 | ......... A61B 5/02427 |

* cited by examiner

STRETCHABLE STRAIN SENSOR, COMBINATION SENSOR, AND DISPLAY PANEL AND DEVICE

CROSS-REFERENCE TO RELATED APPLICATIONS

This application is a divisional of U.S. application Ser. No. 17/339,140, filed Jun. 4, 2021, which claims priority to and the benefit of Korean Patent Application No. 10-2020-0109229 filed in the Korean Intellectual Property Office on Aug. 28, 2020, the entire contents of each of which are incorporated herein by reference.

BACKGROUND

1. Field

A stretchable strain sensor, a combination sensor, a display panel, and a device are disclosed.

2. Description of the Related Art

A strain sensor is a sensor that detects a degree of physical deformation caused by an external force, and may be applied to a wearable device attached to a living body or clothing in recent years, or may be variously applied to check the physical deformation of an object.

SUMMARY

Some example embodiments provide a stretchable strain sensor that may be effectively applied to a living body or an object.

Some example embodiments provide a combination sensor including the stretchable strain sensor.

Some example embodiments provide a display panel including the stretchable strain sensor or the combination sensor.

Some example embodiments provide a device including the stretchable strain sensor, the combination sensor, or the display panel.

According to some example embodiments, a stretchable strain sensor may include a light-emitting element, an optical structure located in a path of light emitted from the light-emitting element, and a photo-detective element configured to detect light transmitted through the optical structure or reflected by the optical structure. The optical structure may be configured to have optical properties that change in response to stretching of at least a portion of the stretchable strain sensor.

At least one of transmittance or reflectance of the optical structure may change according to a strain change or a thickness change of the portion of the stretchable strain sensor in response to the stretching of the portion of the stretchable strain sensor.

The optical structure may include a material which is configured to change at least one of transmittance or reflectance according to a strain change or a thickness change of the portion of the stretchable strain sensor in response to the stretching of the portion of the stretchable strain sensor.

The optical structure may include a light absorbing organic material, a light absorbing inorganic material, a light absorbing organic-inorganic material, a metal, a semi-metal, a carbon material, or a combination thereof.

The optical structure may include a metal thin film including gold, silver, aluminum, magnesium, or an alloy thereof; a metal nanowire; a metal nanotube; a carbon nanotube; or a combination thereof.

The optical structure may have a structure which is configured to change at least one of transmittance or reflectance according to a strain change or a thickness change of the portion of the stretchable strain sensor in response to the stretching of the portion of the stretchable strain sensor.

The optical structure may have a light-transmitting region and a non-transmitting region, and at least one of transmittance or reflectance of the optical structure may change in response to deformation of the light-transmitting region based on stretching of the portion of the stretchable strain sensor.

The optical structure may have pores, fine cracks, holes, or openings.

The stretchable strain sensor may further include a stretchable light-transmitting layer located adjacent to the optical structure, wherein at least one of transmittance or reflectance of the optical structure changes in response to stretching of the stretchable light-transmitting layer.

The optical structure may be in contact with the lower or upper portion of the stretchable light-transmitting layer or is inside the stretchable light-transmitting layer.

The stretchable light-transmitting layer may include a plurality of rigid regions having a first elastic modulus, and a soft region between adjacent rigid regions of the plurality of rigid regions, the soft region having a second elastic modulus that is lower than the first elastic modulus. The light-emitting element may be in at least one rigid region of the plurality of rigid regions, and the optical structure may be in the soft region.

The photo-detective element may be a photodiode, and the photodiode may be in the at least one rigid region.

The photo-detective element may be a thin film transistor, and the thin film transistor may be in the soft region.

The thin film transistor may include an active layer, the active layer including an organic semiconductor and an elastomer.

The photo-detective element may include a photodiode, a photoelectric conversion device, or a thin film transistor. The photo-detective element may be configured to generate an electrical signal that varies according to a light intensity of incident light. The electrical signal of the photo-detective element may not change in response to stretching of the portion of the stretchable strain sensor.

The light-emitting surface of the light-emitting element and the light receiving surface of the photo-detective element may not directly face each other.

According to some example embodiments, a combination sensor may include a bio-signal sensor configured to detect a bio-signal; a stretchable strain sensor configured to detect a strain caused based on stretching of at least a portion of the stretchable strain sensor; and a light-emitting element configured to supply light to the bio-signal sensor and the stretchable strain sensor. The bio-signal sensor may include a first photo-detective element configured to detect reflected light wherein light supplied from the light-emitting element is reflected by an object of a living body. The stretchable strain sensor may include an optical structure disposed in a path of light irradiated from the light-emitting element and a second photo-detective element configured to detect light transmitted through the optical structure or reflected by the optical structure. The optical structure may be configured to have optical properties that change in response to stretching of at least a portion of the stretchable strain sensor.

The light-emitting element may be between the first photo-detective element and the second photo-detective element.

The combination sensor may further include a stretchable light-transmitting layer that supports the bio-signal sensor, the stretchable strain sensor, and the light-emitting element. Optical properties of the optical structure may change in response to stretching of the stretchable light-transmitting layer.

The stretchable light-transmitting layer may include a plurality of rigid regions having a first elastic modulus, and a soft region between adjacent rigid regions of the plurality of rigid regions, the soft region having a second elastic modulus that is lower than the first elastic modulus. The light-emitting element and the first photo-detective element may be in at least one rigid region of the plurality of rigid regions, and the optical structure may be in the soft region.

The second photo-detective element may be in the at least one rigid region or the soft region.

According to some example embodiments, a display panel may include a display area comprising a plurality of first, second, and third sub-pixels, the first, second, and third sub-pixels displaying different colors in relation to one another. The display panel may include a stretchable strain sensor in at least one of the first, second or third sub-pixels or adjacent to at least one of the first, second, or third sub-pixels, the stretchable strain sensor being configured to detect a strain caused by stretching of at least a portion of the stretchable strain sensor. The first, second and third sub-pixels may each include a light-emitting element configured to emit light of a same or different wavelength spectrum from each other. The stretchable strain sensor may include an optical structure in a path of light emitted from the light-emitting element and a photo-detective element configured to detect light transmitted through the optical structure or reflected by the optical structure. The optical structure may be configured to have optical properties that change in response to stretching of the portion of the stretchable strain sensor.

The photo-detective element may include a thin film transistor, and the thin film transistor may include an active layer, the active layer including an organic semiconductor and an elastomer.

The photo-detective element may be configured to generate an electrical signal that varies according to a light intensity of incident light, and the electrical signal of the photo-detective element may not change in response to stretching of the portion of the stretchable strain sensor.

The display panel may further include a stretchable light-transmitting layer that supports the first, second, and third sub-pixels and, the stretchable light-transmitting layer being adjacent to the optical structure. Optical properties of the optical structure may be changed in response to stretching of the stretchable light-transmitting layer.

A device may include the stretchable strain sensor, the combination sensor, or the display panel.

The stretchable strain sensors may be configured to effectively sense a strain when applied to a living body or an object, and it may be effectively applied to a combination sensor or display panel.

DETAILED DESCRIPTION

Figure 1:
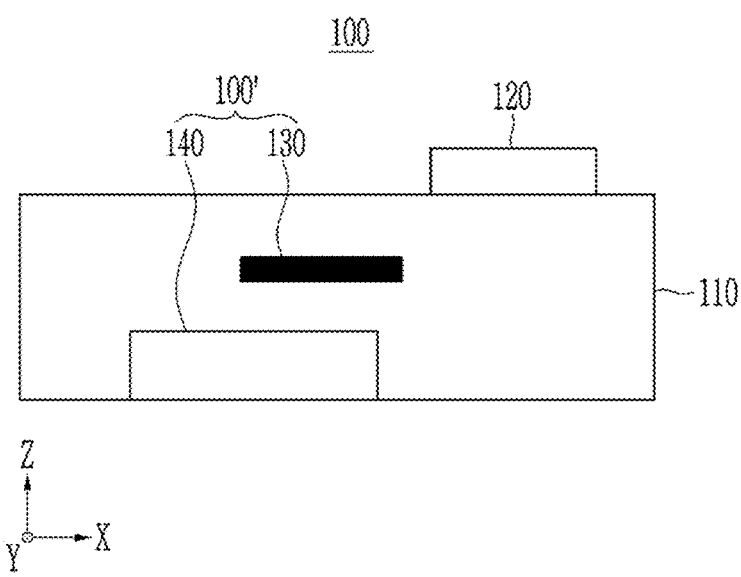
FIG. 1 is a cross-sectional view showing an example of a stretchable strain sensor according to some example embodiments.

Hereinafter, some example embodiments will be described in detail so that those of ordinary skill in the art can easily implement them. However, a structure that is actually applied may be implemented in various different forms, and is not limited to the example embodiments described herein.

In the drawings, the thickness of layers, films, panels, regions, etc., are exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present.

Hereinafter, a stretchable strain sensor according to some example embodiments is described.

Figure 2:
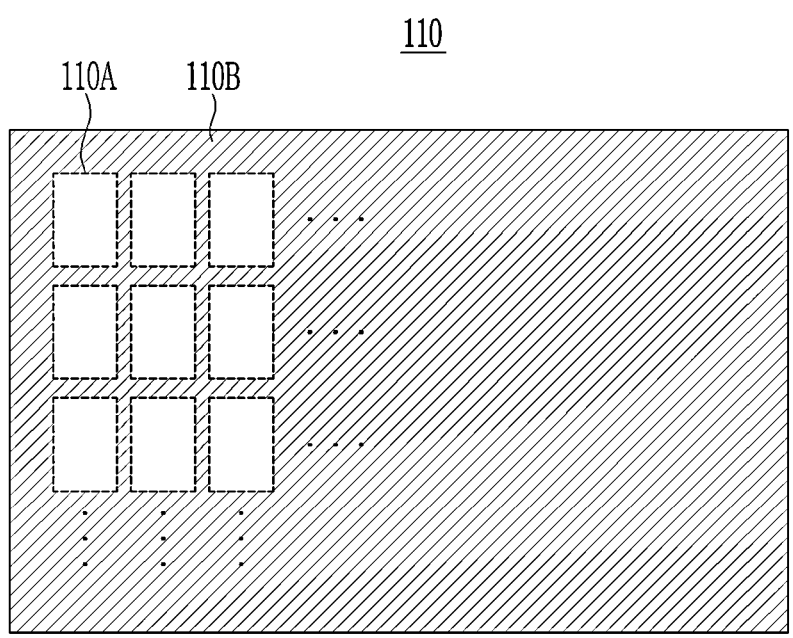
FIG. 2 is a plan view showing an example of a stretchable light-transmitting layer in the stretchable strain sensor of FIG. 1.
Figure 3:
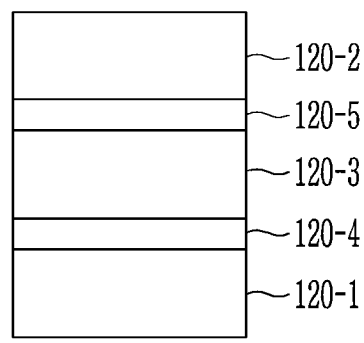
FIG. 3 is a cross-sectional view showing an example of a light-emitting element in the stretchable strain sensor of FIG. 1.
Figure 4:
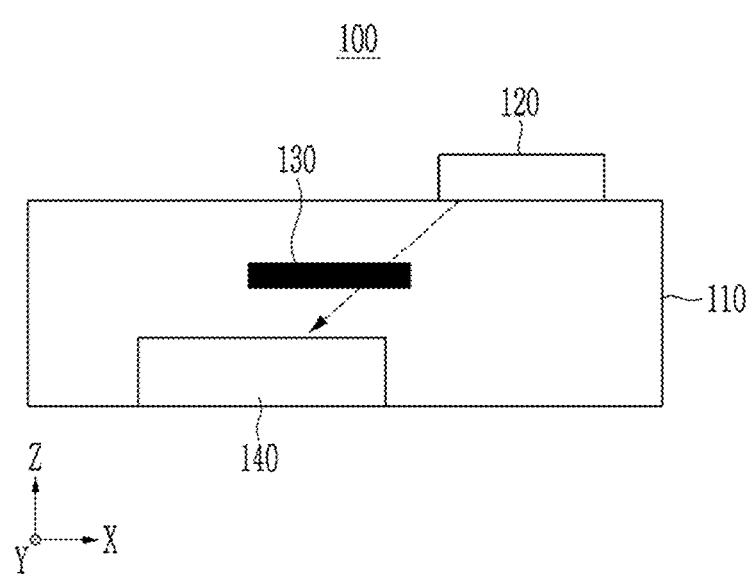
FIG. 4 is a cross-sectional view showing an example including a transmissive optical structure in the stretchable strain sensor of FIG. 1.
Figure 5:
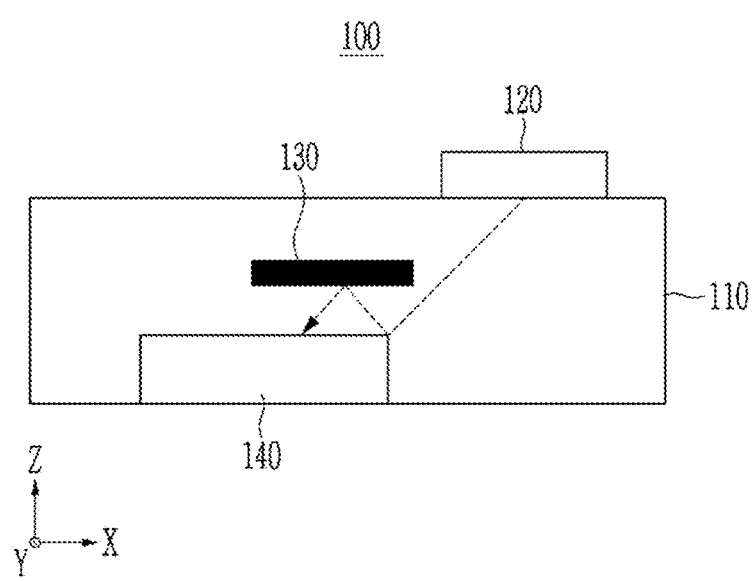
FIG. 5 is a cross-sectional view showing an example including a reflective optical structure in the stretchable strain sensor of FIG. 1, FIGS. 6, 7, and 8 are schematic views showing various examples of an optical structure and examples of deformation during stretching in the stretchable strain sensor of FIG. 1, FIGS. 9, 10, and 11 are cross-sectional views showing various examples of photo-detective elements in the stretchable strain sensor of FIG. 1.

FIG. 1 is a cross-sectional view showing an example of a stretchable strain sensor according to some example embodiments, FIG. 2 is a plan view showing an example of a stretchable light-transmitting layer in the stretchable strain sensor of FIG. 1, FIG. 3 is a cross-sectional view showing an example of a light-emitting element in the stretchable strain sensor of FIG. 1, FIG. 4 is a cross-sectional view showing an example including a transmissive optical structure in the stretchable strain sensor of FIG. 1, FIG. 5 is a cross-sectional view showing an example including a reflective optical structure in the stretchable strain sensor of FIG. 1, FIGS. 6, 7, and 8 are schematic views showing various examples of an optical structure and examples of deformation during stretching in the stretchable strain sensor of FIG. 1, and FIGS. 9, 10, and 11 are cross-sectional views showing various examples of photo-detective elements in the stretchable strain sensor of FIG. 1.

Referring to FIG. 1, a stretchable strain sensor 100 according to some example embodiments includes a stretchable light-transmitting layer 110, a light-emitting element 120, an optical structure 130, and a photo-detective element 140. The optical structure 130 and the photo-detective element 140 may be a strain detective portion 100'.

The stretchable light-transmitting layer 110 may be under the light-emitting element 120 to support the light-emitting element 120. The stretchable light-transmitting layer 110 may be, for example, a support substrate or an interlayer insulating layer, an intermediate layer, or a planarization layer formed on a separate support substrate (not shown). When a separate support substrate is included, the support substrate may be a stretchable substrate. The stretchable light-transmitting layer 110 may be one or two or more layers, and the optical structure 130 and the photo-detective element 140 to be described later may be supported by the stretchable light-transmitting layer 110, may be adjacent to the stretchable light-transmitting layer 110, or may be embedded in the stretchable light-transmitting layer 110.

The stretchable light-transmitting layer 110 may be configured to transmit light, and may have, for example, a light transmittance of greater than or equal to about 70%, greater than or equal to about 75%, greater than or equal to about 80%, greater than or equal to about 85%, greater than or equal to about 90%, greater than or equal to about 95%, greater than or equal to about 97%, greater than or equal to about 98%, or greater than or equal to about 99%. The stretchable light-transmitting layer 110 may be in a direction in which light is irradiated from the light-emitting element 120, and may be, for example, disposed in a path of light that is irradiated from the light-emitting element 120 and reaches the photo-detective element 140.

The stretchable light-transmitting layer 110 may flexibly respond to external forces such as twisting, pressing, and pulling, or external motions, and may be easily restored to its original state. The stretchable light-transmitting layer 110 may include a stretchable material such as an elastomer, and the stretchable material may be an organic elastomer, an organic-inorganic elastomer, an inorganic elastomer-like material, or a combination thereof. The organic elastomer or organic-inorganic elastomer may include substituted or unsubstituted polyorganosiloxane such as polydimethylsiloxane, an elastomer having a substituted or unsubstituted butadiene moiety such as styrene-ethylene-butylene-styrene, an elastomer including a urethane moiety, an elastomer including an acrylic moiety, an elastomer including an olefin moiety, or a combination thereof, but is not limited thereto. The inorganic elastomer-like material may include a ceramic, a solid metal, a liquid metal, or a combination thereof which has elasticity, but is not limited thereto.

Referring to FIG. 2, the stretchable light-transmitting layer 110 may include regions having different stiffness, for example, a rigid region 110A having a relatively high stiffness and a soft region 110B having a lower stiffness than that of the rigid region 110A. As shown, the stretchable light-transmitting layer 110 may include a plurality of rigid regions 110A (e.g., an array thereof as shown in FIG. 2) and a soft region 110B at least partially between adjacent rigid regions 110A of the plurality of rigid regions 110A.

Herein, the stiffness may indicate a degree of resistance to deformation when receiving external force, and relatively high stiffness may mean that the resistance to deformation is relatively large and thus the deformation is small, and relatively low stiffness means that the resistance to deformation is relatively small and thus the deformation is large.

The stiffness may be evaluated from an elastic modulus, and a high elastic modulus may mean a high stiffness, and a low elastic modulus may mean a low stiffness. The elastic modulus may be, for example, Young's modulus. In some example embodiments, the rigid regions 110A may have a first elastic modulus (e.g., high elastic modulus) and the soft region 110B may have a second elastic modulus (e.g., low elastic modulus) that is lower than the first elastic modulus. An elastic modulus difference of one or more or all of the rigid regions 110A and the soft region 110B of the stretchable light-transmitting layer 110 may be about 100 times or higher, and the elastic modulus of one or more or all of the rigid regions 110A (e.g., the first elastic modulus) may be about 100 times or higher than that of the soft region 110B (e.g., the second elastic modulus). The elastic modulus difference of one or more or all of the rigid regions 110A and the soft region 110B may be about 100 times to about 100,000 times within the range, and the elastic modulus of one or more or all of the rigid regions 110A may be about 100 times to about 100,000 times as high as that of the soft region 110B, but is not limited thereto. For example, the elastic modulus of one or more or all of the rigid regions 110A may be about $10^7$ Pa to about $10^{12}$ Pa, and the elastic modulus of the soft region 110B may be greater than or equal to about 10 Pa and less than $10^7$ Pa, but is not limited thereto.

The one or more or all of the rigid regions 110A and the soft region 110B of the stretchable light-transmitting layer 110 may have different elongation rates due to the aforementioned stiffness difference, and the elongation rate of the soft region 110B may be larger than that of one or more or all of the rigid regions 110A. Herein, the elongation rate may be a percentage of a length change elongated from the initial length to a breaking point. For example, the elongation rate of one or more or all of the rigid regions 110A of the stretchable light-transmitting layer 110 may be less than or equal to about 5%, within the range, about 0% to about 5%, about 0% to about 4%, about 0% to about 3%, about 0% to about 2%, about 0% to about 1%, about 0.5% to about 5%, about 0.5% to about 4%, about 0.5% to about 3%, about 0.5% to about 2%, or about 1% to about 2%. For example, the elongation rate of the soft region 110B of the stretchable light-transmitting layer 110 may be greater than or equal to about 10%, and within the range, about 10% to about 1000%, about 10% to about 800%, about 10% to about 500%, about 10% to about 300%, about 10% to about 200%, about 10% to about 100%, about 10% to about 90%, about 10% to about 80%, about 10% to about 70%, about 10% to about 60%, about 10% to about 50%, about 10% to about 40%, about 20% to about 70%, about 20% to about 60%, about 20% to about 50%, or about 20% to about 40%.

The adjacent rigid regions 110A of the stretchable light-transmitting layer 110 may be an island-type separated from one another (e.g., isolated from direct contact with each other). On each island-type rigid region 110A, a device may be disposed, for example, the light-emitting element 120 which is described later may be disposed, and optionally, the photo-detective element 140 may be additionally disposed.

The soft region 110S of the stretchable light-transmitting layer 110 may be all the other regions excluding the rigid regions 110A and may be continuously connected one another. Since the soft region 110S of the stretchable light-transmitting layer 110 is a portion flexibly responding to external forces such as twisting, pressing, and pulling or external motions, the optical structure 130 which is described later may be disposed thereon. The photo-detective element 140 described later may be disposed on at least one rigid region 110A or the soft region 110S according to the presence or absence of stretchability of the photo-detective element 140.

For example, the rigid regions 110A and the soft region 110S of the stretchable light-transmitting layer 110 may have different shapes, for example, one or more or all of the rigid regions 110A of the stretchable light-transmitting layer 110 may be flat, while the soft region 110S of the stretchable light-transmitting layer 110 may include a two dimensional or three dimensional stretchable structure. The two dimensional or three dimensional stretchable structure may have, for example, a wave shape, a wrinkle shape, a popup shape, or a non-coplanar mesh shape, but is not limited thereto.

For example, the rigid regions 110A and the soft region 110S of the stretchable light-transmitting layer 110 may include different materials, for example, one or more or all of the rigid regions 110A of the stretchable light-transmitting layer 110 may include an inorganic material, an organic material, and/or an organic-inorganic material, which have a relatively high stiffness and a relatively low elongation rate, while the soft region 110S of the stretchable light-transmitting layer 110 may include an inorganic material, an organic material, and/or an organic-inorganic material, which have a relatively low stiffness and a relatively high elongation rate. For example, one or more or all of the rigid regions 110A of the stretchable light-transmitting layer 110 may include an organic material such as polycarbonate, polymethyl methacrylate, polyethylene terephthalate, polyethylene naphthalate, polyimide, polyamide, polyamideimide, polyethersulfone, or a combination thereof, a carbon material such as diamond, and the like, and the soft region 110S of the stretchable light-transmitting layer 110 may include an organic or organic-inorganic elastomer, for example, an elastomer including a substituted or unsubstituted polyorganosiloxane such as polydimethylsiloxane, an elastomer including a substituted or unsubstituted butadiene moiety such as styrene-ethylene-butylene-styrene, an elastomer including a urethane moiety, an elastomer including an acrylic moiety, an elastomer including an olefin moiety, or a combination thereof; an inorganic elastomer-like material such as ceramic, a solid metal, a liquid metal, or a combination thereof, but are not limited thereto.

For example, one or more or all of the rigid regions 110A and the soft region 110S of the stretchable light-transmitting layer 110 may be formed based on the same material but formed to have a different stiffness by changing a condition such as a polymerization degree and/or a curing degree. For example, one or more or all of the rigid regions 110A and the soft region 110S of the stretchable light-transmitting layer 110 may be formed based on polydimethylsiloxane by changing a polymerization degree, a type and amount of a hardener, a curing temperature, and/or the like.

The light-emitting element 120 may be on the stretchable light-transmitting layer 110, for example, on one or more or all of the rigid regions 110A of the stretchable light-transmitting layer 110. In some example embodiments, the light-emitting element 120 may be in at least one rigid region 110A of the stretchable light-transmitting layer 110. Accordingly, even when a large external force or motion is applied to the stretchable light-transmitting layer 110, the light-emitting element 120 on one or more or all of the rigid regions 110A of the stretchable light-transmitting layer 110 may receive relatively small strains and thus may be prevented from being damaged or destroyed due to the excessive strains.

The light-emitting element 120 may be configured to emit light in a particular (or, alternatively, predetermined) wavelength spectrum, for example, include an inorganic light emitting diode, an organic light emitting diode (OLED), an organic-inorganic light emitting diode, or a micro light emitting diode.

Referring to FIG. 3, the light-emitting element 120 may include, for example, a pair of electrodes 120-1 and 120-2 and a light emitting layer 120-3 $d$ between the pair of electrodes 120-1 and 120-2. For example, either one of the pair of electrodes 120-1 or 120-2 may be a light-transmitting electrode, and the other one may be a reflecting electrode, for example, an electrode disposed closer to the stretchable light-transmitting layer 110 may be a light-transmitting electrode. For example, the pair of electrodes 120-1 and 120-2 may be stretchable electrodes, and the stretchable electrodes may, for example, include a stretchable conductor or have a stretchable shape such as a wave, a wrinkle, a pop-up, or a non-planar mesh. For example, the light emitting layer 120-3 may include a light-emitting material such as an organic light emitting material, an inorganic light emitting material, a quantum dot, and/or perovskite, but is not limited thereto. The light emitting layer 120-3 may be configured to emit at least a portion of light in a visible wavelength spectrum and/or an infrared wavelength spectrum, for example, light in at least one wavelength spectrum of a blue wavelength spectrum, a green wavelength spectrum, a red wavelength spectrum, and an infrared wavelength spectrum, for example, light in any one wavelength spectrum of the blue wavelength spectrum, the green wavelength spectrum, the red wavelength spectrum, and the infrared wavelength spectrum. The pair of electrodes may be stretchable electrodes, and the light emitting layer 120-3 may be a stretchable light emitting layer, and accordingly, the light-emitting element 120 may be, for example, a stretching element. Each auxiliary layer 120-4 and 120-5 may be between the electrode 120-1 and the light emitting layer 120-3 and/or between the electrode 120-2 and the light emitting layer 120-3, and the auxiliary layers 120-4 and 120-5 may be charge auxiliary layers or light emitting auxiliary layers and include an organic material, an inorganic material, an organic-inorganic material, or a combination thereof.

The optical structure 130 may be disposed closely to the stretchable light-transmitting layer 110, and at least a portion of the optical structure 130 may contact the stretchable light-transmitting layer 110. In the drawing, the optical structure 130 is disposed (e.g., located) inside the stretchable light-transmitting layer 110, so that the entire optical structure 130 may be in contact with the stretchable light-transmitting layer 110, but example embodiments are not limited thereto, and a portion of the optical structure 130 may be in contact with the stretchable light-transmitting layer 110, for example, disposed external to the stretchable light-transmitting layer 110 and under or on the stretchable light-transmitting layer 110, so that a portion of the optical structure 130 may be in contact with the stretchable light-transmitting layer 110 (e.g., in contact with an upper portion or a lower portion of the stretchable light-transmitting layer 110). An upper portion of the stretchable light-transmitting layer 110 may be an upper surface of the stretchable light-transmitting layer 110. A lower portion of the stretchable light-transmitting layer 110 may be a lower surface of the stretchable light-transmitting layer 110.

The optical structure 130 may be disposed in the soft region 110B of the stretchable light-transmitting layer 110, so that external forces or external motions applied to the soft region 110B of the stretchable light-transmitting layer 110 may substantially equally act on the optical structure 130 (e.g., equally within a 10% margin of difference between the external forces or external motions applied to the soft region 110B and on the optical structure 130).

The optical structure 130 may be on a path through which light emitted from the light-emitting element 120 passes, for example, the light emitted from the light-emitting element 120 may be transmitted through the optical structure 130 or reflected by the optical structure 130 and thus reach the photo-detective element 140 which described later. Restated, and as shown in at least FIG. 3, the optical structure 130 may be located in a path of light emitted from the light-emitting element 120.

Optical properties of the optical structure 130 may be changed by stretching. As described herein, the stretching may include stretching of at least a portion of (e.g., part or all of) the stretchable strain sensor 100 (e.g., stretching of the optical structure 130, stretchable light-transmitting layer 110, and/or stretching of any portion of the stretchable strain sensor 100). The optical structure 130 may be configured to have optical properties that are changed in response to stretching of at least a portion of (e.g., part or all of) the stretchable strain sensor 100 (e.g., stretching of the optical structure 130). Specifically, the transmittance and/or reflectance of the optical structure 130 (e.g., at least one of transmittance or reflectance of the optical structure 130) may be changed according to a change in strain and/or a change in thickness of at least a portion of (e.g., part or all of) the stretchable strain sensor 100 (e.g., the optical structure 130, stretchable light-transmitting layer 110, and/or any portion of the stretchable strain sensor 100) by stretching of at least the portion of (e.g., part or all of) the stretchable strain sensor 100 (e.g., stretching of the optical structure 130, stretchable light-transmitting layer 110, and/or stretching of any portion of the stretchable strain sensor 100).

For example, since the optical structure 130, as described above, is disposed in the soft region 110B of the stretchable light-transmitting layer 110, so that external forces or external motions applied to the stretchable light-transmitting layer 110 may substantially equally act on the optical structure 130 (e.g., equally within a 10% margin of difference between the external forces or external motions applied to the light-transmitting layer 110 and on the optical structure 130), transmittance and/or reflectance of the optical structure 130 may be changed by stretching the stretchable light-transmitting layer 110. Accordingly, the change in optical properties of the optical structure 130 may be an index for checking whether or not the stretchable light-transmitting layer 110 or the stretchable strain sensor 100 is stretched and the stretching intensity.

In some example embodiments, as shown in FIG. 4, the optical structure 130 may be a transmissive optical structure of which transmittance is changed by the stretching. For example, as the stretchable light-transmitting layer 110 or the stretchable strain sensor 100 is more stretched, a larger strain may be applied to the optical structure 130 or the optical structure 130 may be thinner, and accordingly, transmittance of the optical structure 130 is increased, and thereby a quantity of light transmissible light emitted from the light-emitting element 120 may be increased. For example, when a particular (or, alternatively, predetermined) strain is applied by the stretching or a particular (or, alternatively, predetermined) thickness is decreased, transmittance of the optical structure 130 may be higher than the transmittance thereof in a non-stretched state (a strain of 0% or a thickness change of 0%). It may be for example, about 1.2 times or higher, about 1.5 times or higher, about 1.8 times or higher, about twice or higher, about 3 times or higher, about 4 times or higher, or about 5 times or higher as high as the transmittance thereof in a non-stretched state. For example, as the stretching intensity is larger, the transmittance of the optical structure 130 may be higher.

In some example embodiments, as shown in FIG. 5, the optical structure 130 may be a reflective optical structure, and reflectance of light reflected in the optical structure 130 may be changed by the stretching. For example, when the particular (or, alternatively, predetermined) strain is applied thereto by the stretching or the particular (or, alternatively, predetermined) thickness is decreased, the reflectance of the optical structure 130 may be lower than the reflectance thereof in the non-stretched state (a strain of 0% or a thickness change of 0%). It may be for example, about 1.2 times or higher, about 1.5 times or higher, about 1.8 times or higher, about twice or higher, about 3 times or higher, about 4 times or higher, or about 5 times or higher as low as the reflectance thereof in the non-stretched state. For example, as the stretching intensity is stronger, the reflectance of the optical structure 130 may be lower.

Accordingly, it will be understood that the optical structure 130 may have a structure which is configured to change at least one of transmittance or reflectance according to a strain change or a thickness change of at least a portion of the stretchable strain sensor 100 (e.g., said structure of the optical structure 130, the optical structure 130 in general, the stretchable light-transmitting layer 110, or any portion of the stretchable strain sensor 100) in response to the stretching of the portion of the stretchable strain sensor 100.

For example, the optical structure 130 may include a material of which transmittance and/or reflectance changes according to a strain change and/or a thickness change by the stretching. Restated, said material of the optical structure 130 may be configured to change at least one of at least one of transmittance or reflectance according to a strain change or a thickness change in response to stretching of at least a portion of the stretchable strain sensor 100. This material, for example, may include a light-absorbing material and/or a light-reflecting material, for example, an organic material, an inorganic material, and/or an organic-inorganic material, whose absorption and/or reflectance changes according to the strain change and/or thickness change by the stretching, or a combination thereof. For example, the optical structure 130 may be a stretchable conductor, a stretchable insulator, a stretchable semiconductor, or a combination thereof. For example, the optical structure 130 may include, for example, a light absorbing organic material, a light absorbing inorganic material, a light absorbing organic-inorganic material, a metal, a semi-metal, a carbon material, or a combination thereof, for example a metal thin film including gold (Au), silver (Au), aluminum (Al), magnesium (Mg), or an alloy thereof; a metal nanowire such as a silver nanowire or a copper nanowire; a metal nanotube; a carbon nanotube; or a combination thereof, but is not limited thereto.

For example, the optical structure 130 may have a structure that changes a transmittance and/or a reflectance according to the strain change and/or thickness change. This structure of the optical structure 130 may have, for example, a light-transmitting region and a non-transmitting region, and transmittance and/or reflectance thereof (e.g., at least one of transmittance or reflectance of the optical structure 130) may be changed by varying a size and/or a shape of the light-transmitting region by the stretching (e.g., in response to deformation of the light-transmitting region based on stretching of at least a portion of the stretchable strain sensor 100, for example stretching of the optical structure 130 and/or of the stretchable light-transmitting layer 110). Herein, the light-transmitting region may be, for example, micropores or at least one hole/opening. For example, the optical structure 130 may have pores, fine cracks, holes, or openings, but is not limited thereto.

Figure 6:
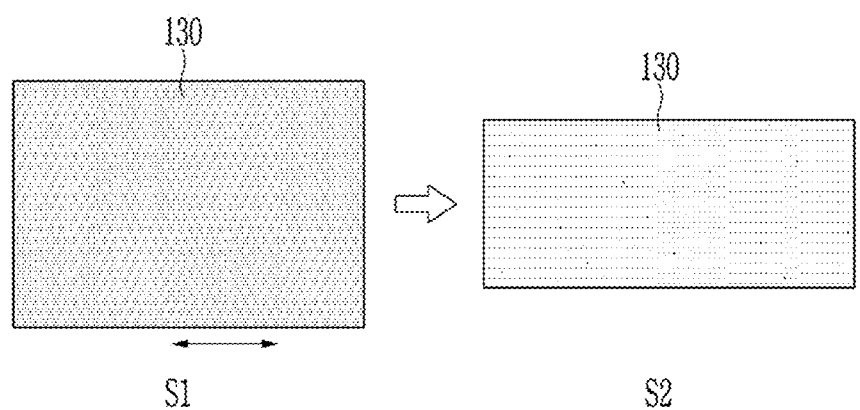

For example, referring to FIG. 6, the optical structure 130 may be a metal thin film whose transmittance changes according to the strain change or the thickness change by the stretching. For example, the optical structure 130 may be a reflective layer in a non-stretched state S1, and may be a transflective layer or a transmissive layer when stretched S2 in a particular (or, alternatively, predetermined) direction (e.g., left-right direction). A thickness of the optical structure 130 of the reflective layer may be greater than about 10 nm, and within the range, for example, greater than about 10 nm and less than or equal to 1 μm, about 20 nm to about 1 μm, about 30 nm to about 1 μm, about 50 nm to about 1 μm, or about 100 nm to about 1 μm, and a thickness of the optical structure 130 of the transflective layer or the transmissive layer may be less than or equal to about 10 nm and within the range, for example, about 1 nm to about 10 nm, about 1 nm to about 8 nm, about 1 nm to about 7 nm, about 1 nm to about 5 nm, about 1 nm to about 4 nm, or about 1 nm to about 3 nm.

Figure 7:
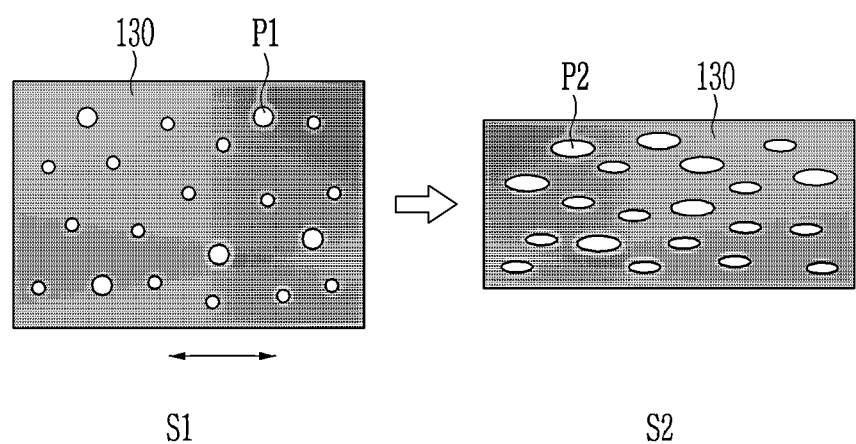

For example, referring to FIG. 7, the optical structure 130 may be a thin film having a plurality of micropores or fine cracks P. For example, the optical structure 130 may have micropores or fine cracks P1 in the non-stretched state S1, and when elongated in a particular (or, alternatively, predetermined) direction (e.g., a lift-light direction) S2, the optical structure 130 may have micropores or fine cracks P2 deformed by the stretching. The deformed micropores or fine cracks P2 may have different sizes and shapes from those of the original micropores or fine cracks P1, and accordingly, the transmittance and/or reflectance of the optical structure 130 before and after the stretching may be changed.

Figure 8:
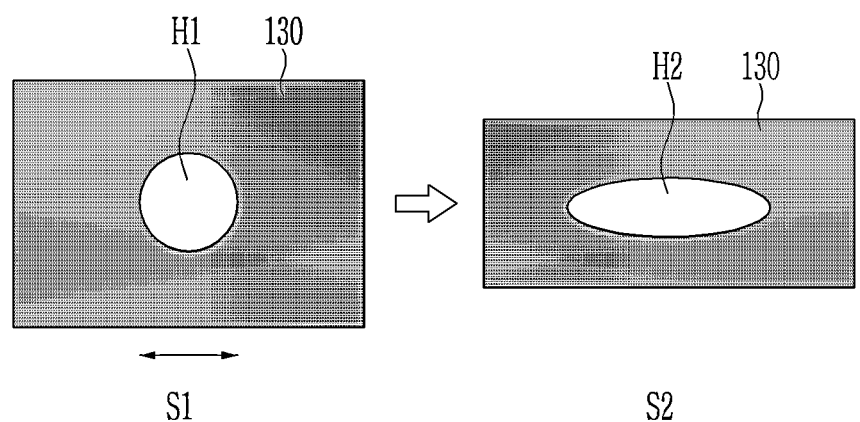

For example, referring to FIG. 8, the optical structure 130 may be a thin film having at least one hole or opening H1. For example, the optical structure 130 may have the hole or opening H1 in the non-stretched state S1, and when stretched in a particular (or, alternatively, predetermined) direction (e.g., a left-right direction) S2, the optical structure 130 may have holes or openings H2 deformed by the stretching. The deformed holes or openings H2 may have different sizes and shapes from those of the original holes or openings H1, and thereby, the transmittance and/or reflectance of the optical structure 130 before and after the stretching may be changed. The holes or openings H1 may have various shapes such as a circle, a polygon, an irregular shape, or the like.

The photo-detective element 140 may be configured to detect light emitted from the light-emitting element 120 and then, transmitted through the optical structure 130 or reflected by the optical structure 130. As shown in at least FIGS. 1 and 4-5, the light-receiving surface of the photo-detective element 140 may be disposed not to directly face the light-emitting surface of the light-emitting element 120, for example, the light-receiving surface of the photo-detective element 140 and the light-emitting surface of the light-emitting element 120 may be disposed to be not overlapped along a thickness direction (e.g., z-direction as shown in FIGS. 1 and 4-5) of the stretchable light-transmitting layer 110.

The photo-detective element 140 may be a photoelectric conversion device configured to absorb light and convert it into an electrical signal, and may be, for example, a photodiode, a phototransistor, and/or a thin film transistor.

As an example, the photo-detective element 140 may be a silicon photodiode. The silicon photodiode may be configured to absorb light transmitted through the optical structure 130 or reflected from the optical structure 130. The silicon photodiode may be disposed, for example, in one or more or all of the rigid regions 110A of the stretchable light-transmitting layer 110. In some example embodiments, the photo-detective element 140 may be included in the same rigid region 110A as the optical structure 130.

Figure 9:
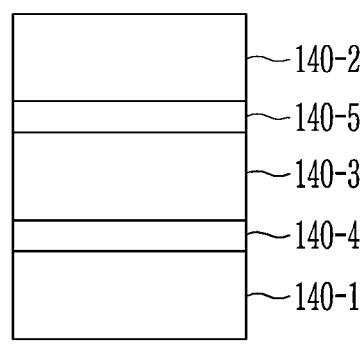

As an example, the photo-detective element 140 may be a stacked photodiode. Referring to FIG. 9, the photo-detective element 140 may include a pair of electrodes 140-1 and 140-2, a photoelectric conversion layer 140-3 between the pair of electrodes 140-1 and 140-2, and optionally, auxiliary layers 140-4 and 140-5. For example, either one of the pair of electrodes 140-1 or 140-2 may be a light-transmitting electrode, while the other one may be a reflective electrode, for example, an electrode disposed close to the optical structure 130 out of the pair of electrodes 140-1 and 140-2 may be a light-transmitting electrode. For example, the photoelectric conversion layer 140-3 may be, for example, an inorganic semiconductor, an organic semiconductor, and/or an organic-inorganic semiconductor, for example, a p-type semiconductor and an n-type semiconductor forming pn junctions. For example, the photoelectric conversion layer 140-3 may be a stretchable photoelectric conversion layer. For example, the auxiliary layers 140-4 and 140-5 may be between the electrodes 140-1 and 140-2, and the photoelectric conversion layer 140-3 may be, for example, a charge auxiliary layer, an optical auxiliary layer, or a combination thereof. At least one of the auxiliary layers 140-4 or 140-5 may be omitted. A photodiode may be in one or more or all of the rigid regions 110A or the soft region 110B of the stretchable light-transmitting layer 110 according to the presence or absence of stretchability of the photodiode.

Figure 10:
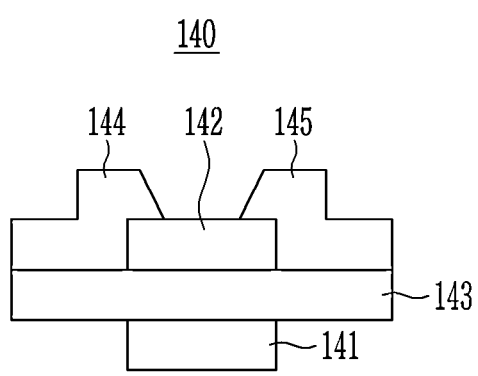
Figure 11:
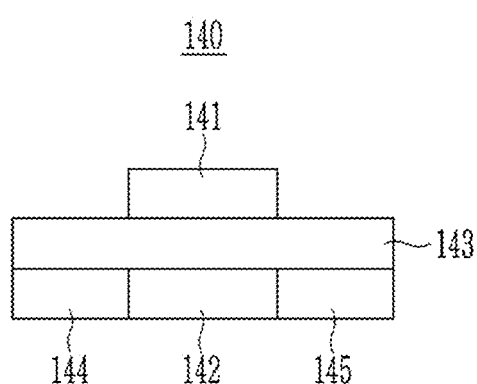

For example, the photo-detective element 140 may be a thin film transistor. Referring to FIGS. 10 and 11, the photo-detective element 140 may include a thin film transistor that may include a gate electrode 141, an active layer 142 on or under the gate electrode 141 to be overlapped with the gate electrode 141, a gate insulating layer 143 between the gate electrode 141 and the active layer 142, a source electrode 144 electrically connected to the active layer 142, and a drain electrode 145. The gate electrode 141, the source electrode 144, and the drain electrode 145 may include an opaque conductor or a transparent conductor. The gate insulating layer 143 may be, for example, a portion of the stretchable light-transmitting layer 110. The active layer 142, where current flows due to the absorbed light, may include an organic semiconductor, an inorganic semiconductor, and/or an organic-inorganic semiconductor. For example, the active layer 142 may be a stretchable active layer including the organic semiconductor and an elastomer, and the elastomer may be an organic elastomer, an organic-inorganic elastomer, an inorganic elastomer-like material, or a combination thereof, which is the same as described above. The active layer 142 may be on the side where light transmitted through the optical structure 130 or reflected by the optical structure 130 enters, for example, when the light enters from top, a thin film transistor with a bottom gate structure may be obtained, as shown in FIG. 10, but when the light enters from the bottom, a thin film transistor with a top gate structure may be obtained, as shown in FIG. 11. For example, the thin film transistors may be stretchable thin film transistors. The stretchable thin film transistors may be, for example, in the soft region 1108 of the stretchable light-transmitting layer 110.

The photo-detective element 140 may be configured to convert the absorbed light into electrical signals (e.g., generate an electrical signal based on absorbing incident light), and the electrical signals may be changed according to the light intensity (e.g., the electrical signals may vary according to a light intensity of the incident light). On the other hand, the electrical signals of the photo-detective element 140 may not be changed or substantially changed by the stretching (e.g., in response to stretching of at least a portion of the stretchable strain sensor 100). Accordingly, the electrical signal change of the photo-detective element 140 may be used to check a quantity of the light transmitted through the optical structure 130 or reflected by the optical structure 130 and thus to effectively detect the stretching and the resulting strain therefrom.

It will be understood that, when an element, property, or the like (e.g., an electrical signal) is described herein to not change, the element, property, or the like (e.g., the electrical signal) may not change or may not substantially change. It will be understood that "substantially" changing may refer to a change of more than 10% of a magnitude of at least one property of the element, property, or the like (e.g., a current, voltage, intensity, frequency, or the like). Thus, when, for example, an electrical signal generated by the photo-detective element 140 is described to not change in response to stretching of at least a portion of the stretchable strain sensor 100, it will be understood that the electrical signal may not substantially change, such that a magnitude of at least one property of the electrical signal (e.g., current, voltage, frequency, etc.) may not change more than 10% in magnitude in response to the stretching.

Hereinafter, another example of a stretchable strain sensor according to some example embodiments is described.

Figure 12:
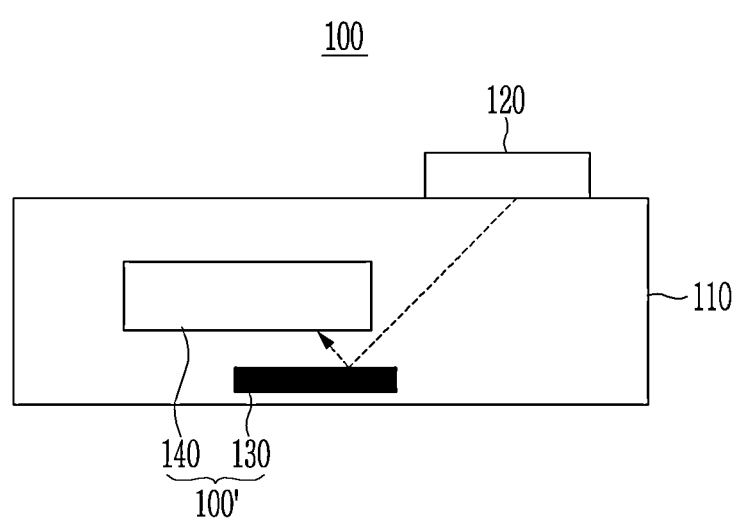
FIG. 12 is a cross-sectional view showing another example of a stretchable strain sensor according to some example embodiments.

FIG. 12 is a cross-sectional view showing another example of a stretchable strain sensor according to some example embodiments.

Referring to FIG. 12, the stretchable strain sensor 100 according to some example embodiments, including the example embodiments shown in FIG. 12, like some example embodiments, including the example embodiments shown in FIGS. 1-11, includes the stretchable light-transmitting layer 110, the light-emitting element 120, the optical structure 130, and the photo-detective element 140. The stretchable light-transmitting layer 110, the light-emitting element 120, the optical structure 130, and the photo-detective element 140 are the same as described above.

However, in the stretchable strain sensor 100 according to some example embodiments, including the example embodiments shown in FIG. 12, unlike some example embodiments, including the example embodiments shown in FIGS. 1-11, the optical structure 130 is under the photo-detective element 140. The optical structure 130 may be, for example, a reflective optical structure, and the reflectance of light reflected by the optical structure 130 may be changed by the stretching. Since the light reflected by the optical structure 130 enters through the bottom of the photo-detective element 140, the photo-detective element 140 may be a thin film transistor with a top gate structure in which the active layer 142 is disposed at the bottom.

In this way, the stretchable strain sensor 100 includes the optical structure 130 having a stretching dependency and detects light transmitted through the optical structure 130 or reflected by the optical structure 130 in the photo-detective element 140 and thus may effectively detect a strain degree of the stretchable strain sensor 100. This stretchable strain sensor 100 may detect a strain change by an electrical signal change of the photo-detective element 140 without an additional process or a complex circuit and thus be effectively applied to a device requiring the detection of the strain change. The device may be any device applied to a living body or an object.

The stretchable strain sensor 100 may be effectively applied to various devices requiring stretchability. For example, the stretchable strain sensor 100 may be applied to a wearable device such as a wearable bioelectronics device; a skin-like device; or smart clothing and thus may be used to obtain biometric signals or motion signals, or may be applied to objects for which strain is to be monitored, so that strain changes may be checked in real time. For example, the stretchable strain sensor 100 may be applied to a wearable bioelectronic device in the form of a patch or a band, and the wearable bioelectronic device may be attached to a region to be treated to obtain necessary data.

The aforementioned stretchable strain sensor 100 may be applied in the form of an array arranged along rows and/or columns.

Figure 13:
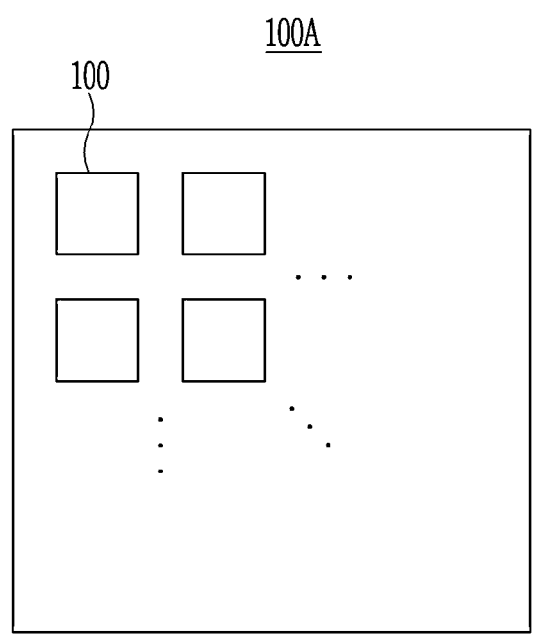
FIG. 13 is a schematic view showing an example of a stretchable strain sensor array including a stretchable strain sensor according to some example embodiments.

FIG. 13 is a schematic view showing an example of a stretchable strain sensor array including a stretchable strain sensor according to some example embodiments.

Referring to FIG. 13, the stretchable strain sensor array 100A includes a plurality (e.g., array) of stretchable strain sensors 100 arranged along rows and/or columns. However, the present disclosure is not limited thereto, and the arrangement of the stretchable strain sensor 100 may be varied.

A plurality of stretchable strain sensors 100 may independently work, and as described above, each stretchable strain sensor 100 may have a different electrical signal depending on the stretching and the strain change according thereto, and accordingly, a position where the strain change occurs may be effectively detected.

For example, a wearable bioelectronic device including the stretchable strain sensor array 100A may be attached to where treatment is desired to effectively detect a position where a strain occurs from muscle or joint motions and thus effectively obtain data needed for rehabilitation.

For example, the aforementioned stretchable strain sensor 100 may be applied as a combination sensor that is included with other sensors to perform a combination function.

Figure 14:
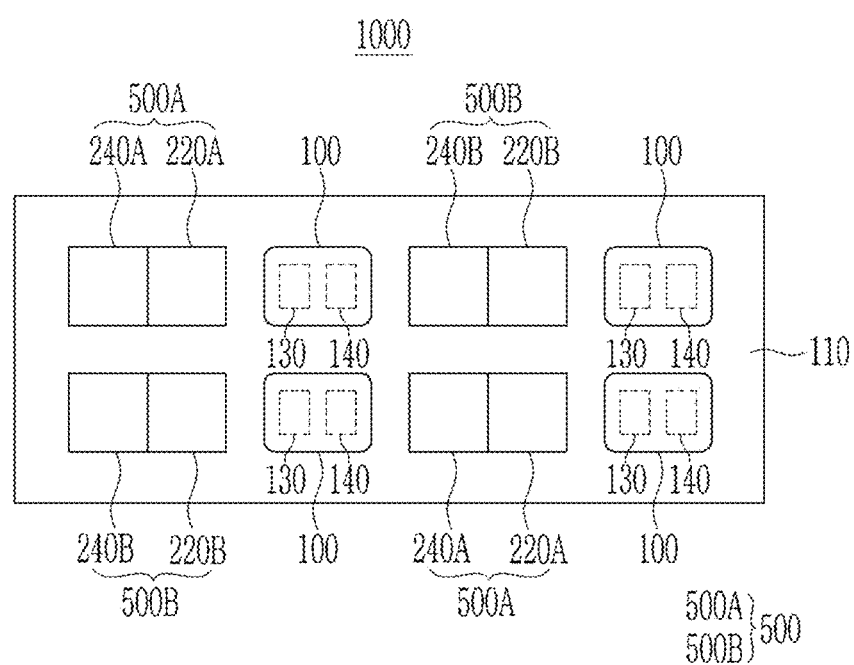
FIG. 14 is a plan view schematically showing an example of a combination sensor according to some example embodiments.

FIG. 14 is a plan view schematically showing an example of a combination sensor according to some example embodiments.

Referring to FIG. 14, a combination sensor 1000 according to some example embodiments includes a bio-signal sensor 500 configured to detect a bio-signal and a stretchable strain sensor 100 configured to detect a strain caused by stretching (e.g., stretching of at least a portion of the stretchable strain sensor 100 as described herein). The stretchable strain sensor 100 may be a stretchable strain sensor according to any of the example embodiments.

The bio-signal sensor 500 is a sensor for detecting (e.g., configured to detect) biometric information through a bio-signal, and may be, for example, a photoplethysmography (PPG) sensor, a blood pressure (BP) sensor, a blood glucose (BG) sensor, and/or a near-infrared brain image sensor, etc., but is not limited thereto. For example, the bio-signal sensor 500 may be a PPG sensor, and PPG signals may be analyzed to obtain the user's living body information such as a blood pressure, arrhythmia, a heart rate, and/or oxygen saturation.

The bio-signal sensor 500 may include a first bio-signal sensor 500A and a second bio-signal sensor 500B on the stretchable light-transmitting layer 110. The stretchable light-transmitting layer 110 is the same as described above and may support the bio-signal sensor 500. The first bio-signal sensor 500A and the second bio-signal sensor 500B may be, for example, disposed in one or more or all of the rigid regions 110A of the stretchable light-transmitting layer 110.

The first bio-signal sensor 500A may be, for example, a red/infrared light-emitting element 220A configured to emit light in a red wavelength spectrum and/or an infrared wavelength spectrum and a photo-detective element 240A configured to detect light reflected by an object such as a blood vessel from the light emitted from the red/infrared light-emitting element 220A. The second bio-signal sensor 500B may include, for example, a green light-emitting element 220B configured to emit light in a green wavelength spectrum and a photo-detective element 240B configured to detect light reflected by the object such as a blood vessel of a living body from the light emitted from the green light-emitting element 220B. The red/infrared light-emitting element 220A and the green light-emitting element 220B may be used for absorption and/or reflection characteristics of, for example, oxyhemoglobin ($HbO_2$) and hemoglobin (Hb) in blood vessels. One of the first bio-signal sensor 500A or the second bio-signal sensor 500B may be omitted.

The stretchable strain sensor 100 may be between, for example, the first bio-signal sensor 500A and the second bio-signal sensor 500B, but is not limited thereto. The stretchable strain sensor 100 includes a light-emitting element 120, an optical structure 130, and a photo-detective element 140 as described above, and detailed descriptions thereof are as described above.

The combination sensor 1000 may simultaneously perform a function of detecting a bio-signal such as a PPG signal and a function of detecting a change in strain by stretching by including the bio-signal sensor 500 and the stretchable strain sensor 100 together.

Figure 15:
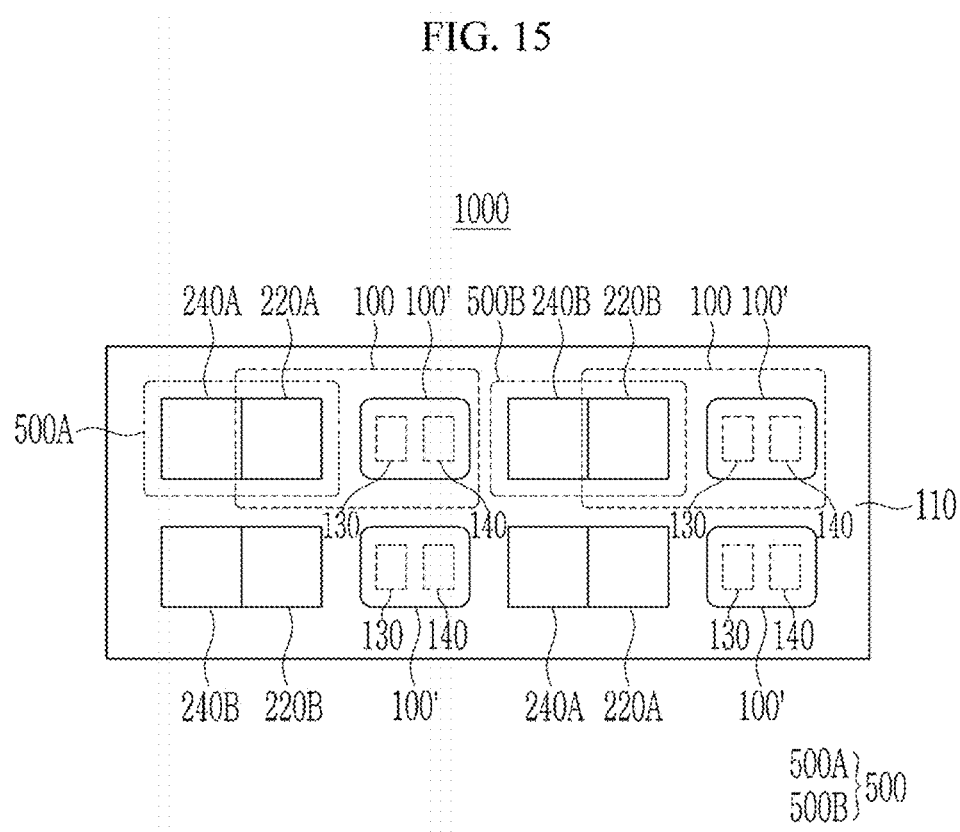
FIG. 15 is a plan view schematically showing another example of a combination sensor according to some example embodiments.

FIG. 15 is a plan view schematically showing another example of a combination sensor according to some example embodiments.

Referring to FIG. 15, a combination sensor 1000 according to some example embodiments, including the example embodiments shown in FIG. 15, like some example embodiments, including the example embodiments shown in FIG. 14, includes a bio-signal sensor 500 configured to detect a bio-signal and a stretchable strain sensor 100 configured to detect a strain caused by the stretching.

However, unlike some example embodiments, including the example embodiments shown in FIG. 14, the bio-signal sensor 500 and the stretchable strain sensor 100 may share light-emitting elements 220A and 220B. In other words, the first bio-signal sensor 500A may include the red/infrared light-emitting element 220A configured to emit light in a red wavelength spectrum and/or an infrared wavelength spectrum and a photo-detective element 240A configured to detect light reflected by an object such as a blood vessel of a living body from the light emitted from the red and/or infrared light-emitting element 220A, and the adjacent stretchable strain sensor 100 may include the red/infrared light-emitting element 220A and a strain detective portion 100' including the aforementioned optical structure 130 and photo-detective element 140. The red/infrared light-emitting element 220A may be between the photo-detective element 240A of the first bio-signal sensor 500A and the photo-detective element 140 of the stretchable strain sensor 100.

Likewise, the second bio-signal sensor 500B may include a green light-emitting element 220B configured to emit light in a green wavelength spectrum and a photo-detective element 240B configured to detect light reflected by an object such as a blood vessel from the light emitted from the green light-emitting element 220B, and the adjacent stretchable strain sensor 100 may include the green light-emitting element 220B and a strain detective portion 100' including the aforementioned optical structure 130 and photo-detective element 140. The green light-emitting element 220B may be between the photo-detective element 240B of the second bio-signal sensor 500B and the photo-detective element 140 of the stretchable strain sensor 100.

The stretchable light-transmitting layer 110 may support (e.g., structurally support) the bio-signal sensor 500, stretchable strain sensor 100, and light-emitting element 120. The light-emitting elements 220A and 220B and the photo-detective elements 240A and 240B of the bio-signal sensor 500 may be in the one or more or all of the rigid regions 110A of the stretchable light-transmitting layer, respectively, the optical structure 130 of the stretchable strain sensor 100 may be disposed in the soft region 110B of the stretchable light-transmitting layer 110, and the photo-detective element 140 of the stretchable strain sensor 100 may be in one or more or all of the rigid regions 110A or the soft region 110B of the stretchable light-transmitting layer 110 according to the presence or absence of stretchability.

Accordingly, the combination sensor 1000 shares the light-emitting elements 220A and 220B and thus may save a space and simplify a process.

For example, the aforementioned stretchable strain sensor 100 may be included in a display panel. For example, the stretchable strain sensor 100 included in the display panel may be applied as a strain indicator indicating a position where the strain acts.

Figure 16:
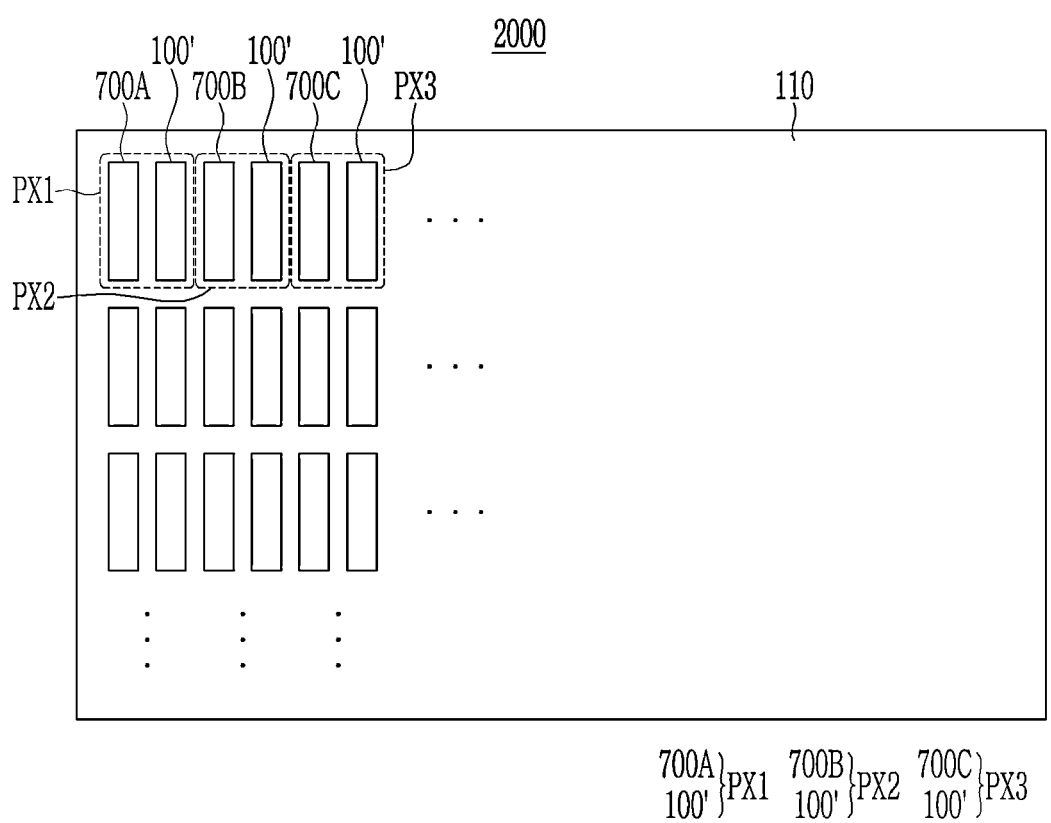
FIG. 16 is a plan view schematically showing an example of a display panel according to some example embodiments.

FIG. 16 is a plan view schematically showing an example of a display panel according to some example embodiments.

Referring to FIG. 16, a display panel 2000 according to some example embodiments includes a plurality of first, second and third sub-pixels PX1, PX2, and PX3 on the stretchable light-transmitting layer 110. The stretchable light-transmitting layer 110 may support the first, second and third sub-pixels PX1, PX2, and PX3. The first, second and third sub-pixels PX1, PX2, and PX3 may display different colors in relation to each other, for example, respectively one of three primary colors. For example, the first sub-pixel PX1 may display red, the second sub-pixel PX2 may display green, and the third sub-pixel PX3 may display blue.

The first, second, and third sub-pixels PX1, PX2, and PX3 may independently include light-emitting elements 700A, 700B, and 700C. The light-emitting elements 700A, 700B, and 700C may be, for example, an inorganic light emitting diode, an organic light emitting diode (OLED), an organic-inorganic light emitting diode, or a micro light emitting diode.

For example, the light-emitting elements 700A, 700B, and 700C included in the first, second and third sub-pixels PX1, PX2, and PX3 may be configured to emit light of the same wavelength spectrum. For example, the first sub-pixel PX1 may be a sub-pixel displaying red and display red by additionally treating light emitted from the light-emitting element PX1 included in the first sub-pixel PX1 with a red conversion layer such as a red filter. For example, the second sub-pixel PX2 may be a sub-pixel displaying green and display green by additionally treating light emitted from the light-emitting element PX2 included in the second sub-pixel PX2 with a green conversion layer such as a green filter. For example, the third sub-pixel PX3 may be a sub-pixel displaying blue and display blue by additionally treating light emitted from the light-emitting element PX3 included in the third sub-pixel PX3 with a blue conversion layer such as a blue filter.

For example, the light-emitting elements 700A, 700B, and 700C included in the first, second, and third sub-pixels PX1, PX2, and PX3 may be configured to emit light of same or different wavelength spectra from each other. For example, the first sub-pixel PX1 may be a sub-pixel displaying red and include the light-emitting element 700A configured to emit light in the red wavelength spectrum. For example, the second sub-pixel PX2 may be a sub-pixel displaying green and include the light-emitting element 700B configured to emit light in a green wavelength spectrum. For example, the third sub-pixel PX3 may be a sub-pixel displaying blue and include the light-emitting element 700C configured to emit light in the blue wavelength spectrum.

The display panel 2000 may include a stretchable strain sensor 100 in at least one of the first, second, or third sub-pixels PX1, PX2, and PX3 and configured to detect a strain caused by stretching of at least a portion of the display panel 2000 and/or the stretchable strain sensor 100. In some example embodiments, the light-emitting elements 700A, 700B, and 700C included in the first, second and third sub-pixels PX1, PX2, and PX3 are each a light-emitting element of the stretchable strain sensor 100. For example, the stretchable strain sensor 100 included in the first sub-pixel PX1 includes the light-emitting element 700A and the strain detective portion 100' including the aforementioned optical structure 130 and photo-detective element 140. The optical structure 130 may be configured to have optical properties that change in response to stretching of at least a portion of the stretchable strain sensor 100 and/or the display panel 2000. One or more of the aforementioned optical structure 130 and/or photo-detective element 140 may be adjacent to the stretchable light-transmitting layer 110. The stretchable strain sensor 100 included in the first sub-pixel PX1 may detect light transmitted through the optical structure 130 or reflected by the optical structure 130 from the light emitted from the light-emitting element 700A in the photo-detective element 140 and convert the detected light into electrical signals, and these electrical signals may be used to detect the degree of strains. Likewise, the stretchable strain sensor 100 included in the second sub-pixel PX2 includes the light-emitting element 700B and the strain detective portion 100' including the aforementioned optical structure 130 and photo-detective element 140. The stretchable strain sensor 100 included in the second sub-pixel PX2 may detect light transmitted through the optical structure 130 or reflected by the optical structure 130 from the light emitted from the light-emitting element 700B in the photo-detective element 140 and convert the detected light into electrical signals, and these electrical signals may be used to detect the degree of strain. Likewise, the stretchable strain sensor 100 included in the third sub-pixel PX3 includes the light-emitting element 700C and the strain detective portion 100' including the aforementioned optical structure 130 and photo-detective element 140. The stretchable strain sensor 100 included in the third sub-pixel PX3 may detect light transmitted through the optical structure 130 or reflected by the optical structure 130 from the light emitted from the light-emitting element 700C in the photo-detective element 140 and convert the detected light into electrical signals, and these electrical signals may be used to detect the degree of strains. Accordingly, where the strain is applied in the display panel 2000 may be specified, and accordingly, the stretchable strain sensor 100 may be used as a strain indicator showing a position where the strain is applied.

In the drawings, a structure in which the strain detective portion 100' is included in the first, second and third sub-pixels PX1, PX2, and PX3 is shown but not limited thereto and may be disposed close to at least one of the first, second or third sub-pixels PX1, PX2, or PX3.

In the drawings, a structure in which the strain detective portion 100' is included in the first, second, and third sub-pixels PX1, PX2, and PX3 is shown but not limited thereto and may be included in at least one of the first, second, or third sub-pixels PX1, PX2, or PX3.

The aforementioned stretchable strain sensor 100, combination sensor 1000, and display panel 2000 may be included in various devices requiring stretchability, for example, a wearable device or a skin-like device, a large-area conformable display device, smart clothing, and the like, but are not limited thereto.

Hereinafter, some example embodiments are illustrated in more detail with reference to examples. However, the scope of the example embodiments is not limited to the examples.
Manufacture of Sensor Example 1

A gold (Au) thin film having fine cracks is formed on a styrene-ethylene-butylene-styrene (SEBS) substrate to prepare a gold (Au) optical structure. Subsequently, the light-emitting surface of a light-emitting element (a laser diode, $\lambda_{max}$=633 nm) is disposed at an angle θ with the light-receiving surface of a photo-detective element (power meter, PM16-120, Thorlabs Inc.), and then, the Au optical structure is disposed between the light-emitting element and the photo-detective element to manufacture a sensor.
Evaluation I When the light-emitting element (radiation intensity: 0.8 mW) and the photo-detective element of the sensor according to Example 1 are operated, and then, the Au optical structure is elongated in a left-right direction, transmittance changes thereof depending on the angle θ and a strain are evaluated.

Figure 17:
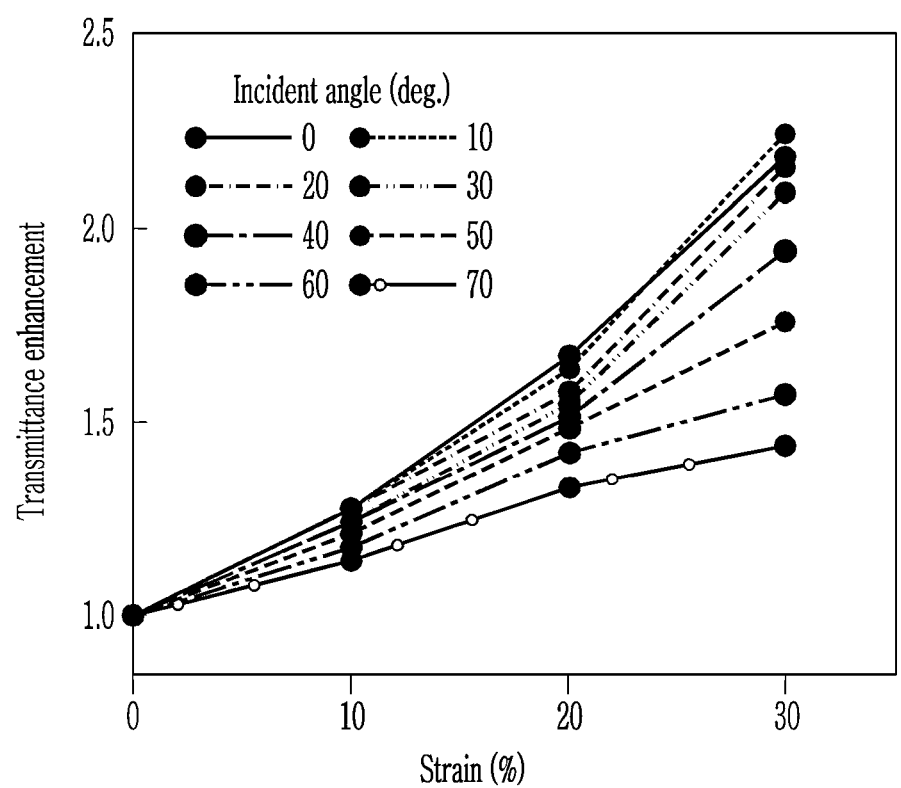
FIGS. 17 and 18 are graphs showing transmittance changes according to strains and angles (θ) between the light-emitting surface and the light-receiving surface in the sensor according to Example 1.
Figure 18:
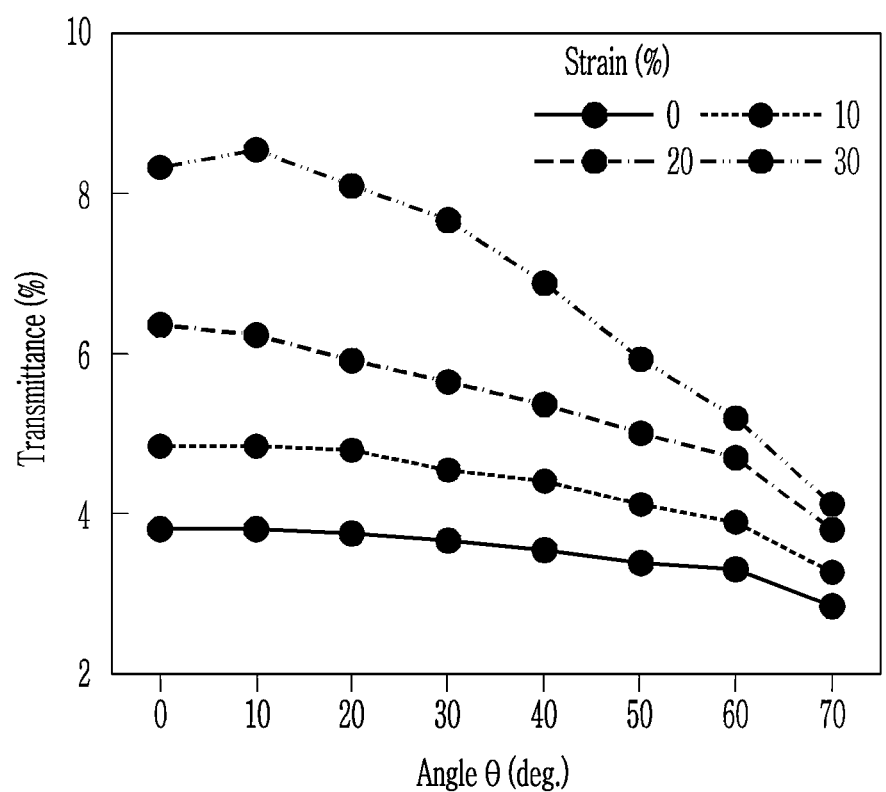

The results are shown in FIGS. 17 and 18.

FIGS. 17 and 18 are graphs showing transmittance changes according to strains and angles θ between the light-emitting surface and the light-receiving surface in the sensor according to Example 1.

Referring to FIGS. 17 and 18, the sensor according to Example 1 exhibits transmittance changes depending on the strain and the angle θ between the light-emitting surface and the light-receiving surface, and specifically, as the strain is increased, the fine crack of the Au optical structure becomes larger, and thus the transmittance is increased, and as the angle θ between the light-emitting surface and the light-receiving surface is larger, a light path through the Au optical structure becomes longer, and thus the transmittance becomes lower.

Manufacture of Thin Film Transistor

Example 2

A gate electrode is formed on a SEBS stretchable substrate, and a SEBS solution is coated thereon and then, annealed at 100° C. for 0.5 hours to form a gate insulating layer. Subsequently, on the gate insulating layer, an organic semiconductor represented by Chemical Formula A and SEBS are blended in a weight ratio of 3:7 to prepare an organic semiconductor solution, and the organic semiconductor solution is coated and then, heat-treated at 100° C. for 1 hour to form a stretchable organic semiconductor thin film. Subsequently, on the stretchable organic semiconductor thin film, Au is thermally deposited to form a source electrode and a drain electrode and thus manufacture a stretchable thin film transistor.

<Chemical Formula A>

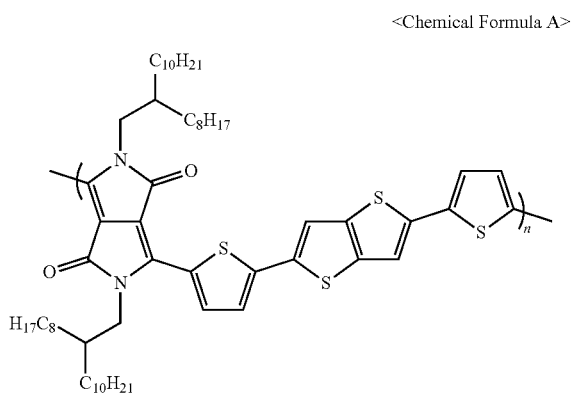

Evaluation II

Electrical signals of the stretchable thin film transistor according to Example 2 are evaluated according to stretching.

The electrical signals according to the stretching are evaluated by a current value ($I_{DS}$) between the source electrode and the drain electrode, when a voltage ranging from 5 V to −20 V is applied between the gate electrode and the source electrode under a voltage condition of 20 V.

Figure 19:
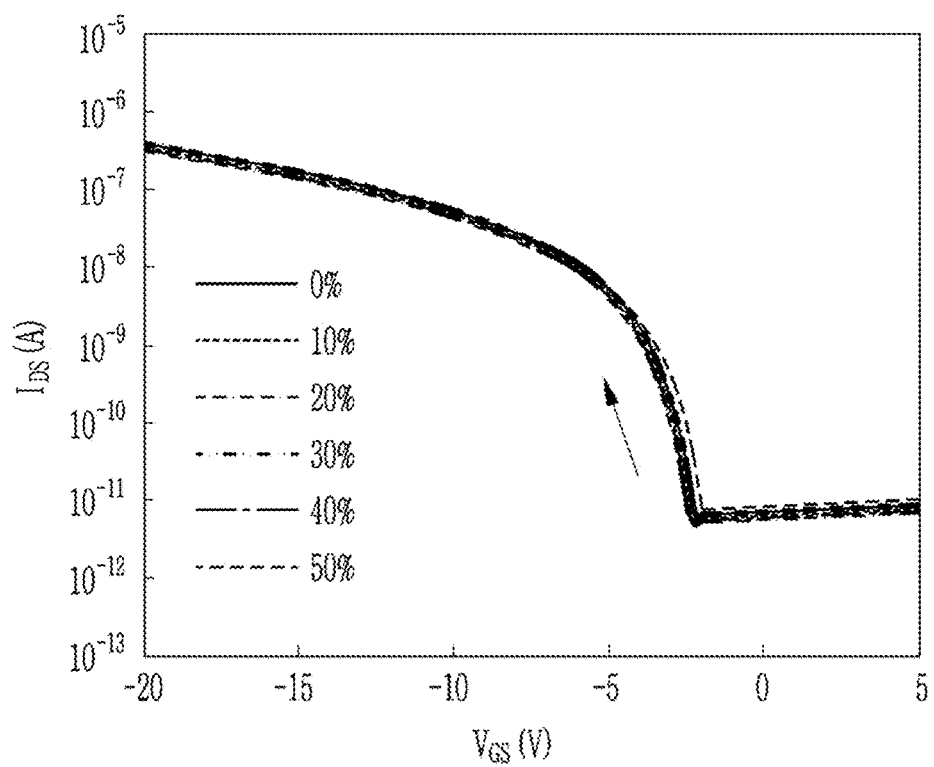
FIG. 19 is a graph showing electrical characteristics according to strain when the stretchable thin film transistor according to Example 2 is stretched in a vertical direction with respect to a channel length direction.

The results are shown in FIG. 19.

FIG. 19 is a graph showing electrical characteristics according to strains, when the stretchable thin film transistor according to Example 2 is stretched in a vertical direction with respect to a channel length direction.

Referring to FIG. 19, the stretchable thin film transistor according to Example 2 exhibits substantially equivalent electrical properties (e.g., electrical properties having electrical properties that do not vary more than 10% in magnitude) within the strain range of strain 0% to 50%. Accordingly, the stretchable thin film transistor according to Example 2 exhibits no electrical property change.

Evaluation III

Electrical signals of the stretchable thin film transistor according to Example 2 are evaluated depending on light intensity.

The electrical signals according to light signals are evaluated by a current value ($I_{DS}$) between the source electrode and the drain electrode according to white light intensity of incident light into the thin film transistor, when a voltage of −10 V is applied between the gate electrode and the source electrode.

Figure 20:
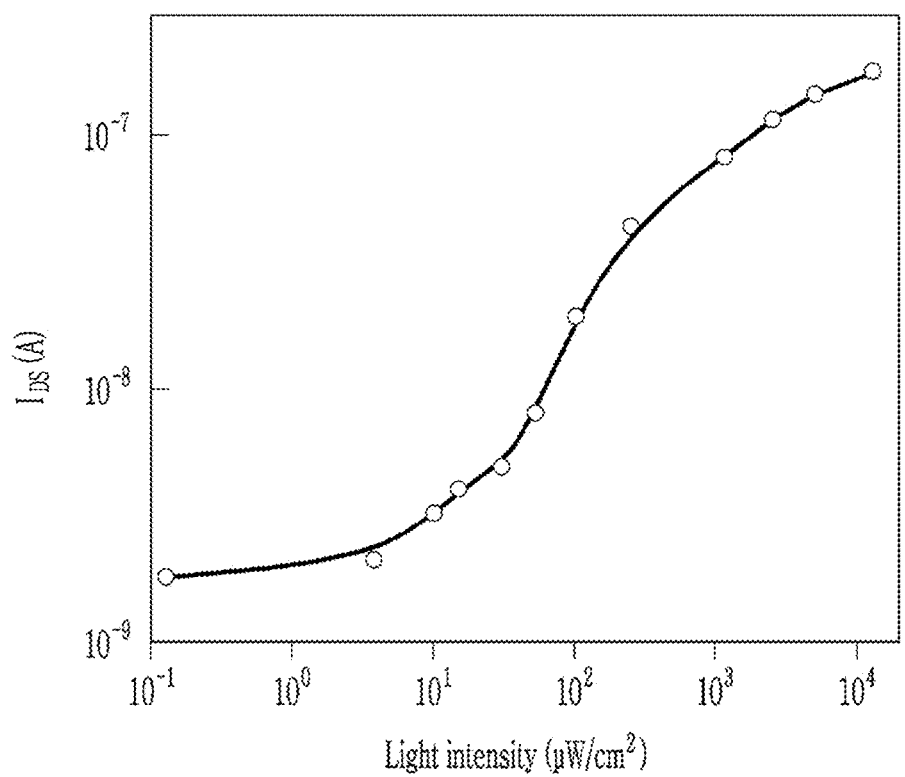
FIG. 20 is a graph showing electrical characteristics according to light intensity of a stretchable thin film transistor according to Example 2.

The results are shown in FIG. 20.

FIG. 20 is a graph showing electrical characteristics according to light intensity of a stretchable thin film transistor according to Example 2.

Referring to FIG. 20, the stretchable thin film transistor according to Example 2 exhibits that as the light intensity is increased, the current is increased. Accordingly, the stretchable thin film transistor according to Example 2 exhibits an electrical property change according to the light intensity.

While this disclosure has been described in connection with what is presently considered to be practical example embodiments, it is to be understood that the inventive concepts are not limited to the example embodiments. On the contrary, it is intended to cover various modifications and equivalent arrangements included within the spirit and scope of the appended claims.

What is claimed is:

1. A combination sensor, comprising:
a bio-signal sensor configured to detect a bio-signal;
a stretchable strain sensor configured to detect a strain caused based on stretching of at least a portion of the stretchable strain sensor; and
a light-emitting element configured to supply light to the bio-signal sensor and the stretchable strain sensor,
wherein the bio-signal sensor includes a first photo-detective element configured to detect reflected light wherein light supplied from the light-emitting element is reflected by an object of a living body,
wherein the stretchable strain sensor includes
an optical structure disposed in a path of light irradiated from the light-emitting element, the optical structure configured to have optical properties that change in response to stretching of at least the portion of the stretchable strain sensor, and
a second photo-detective element configured to detect light transmitted through the optical structure or reflected by the optical structure.

2. The combination sensor of claim 1, wherein
the light-emitting element is between the first photo-detective element and the second photo-detective element.

3. The combination sensor of claim 1, further comprising:
a stretchable light-transmitting layer that supports the bio-signal sensor, the stretchable strain sensor, and the light-emitting element,
wherein the optical properties of the optical structure change in response to stretching of the stretchable light-transmitting layer.

4. The combination sensor of claim 3, wherein
the stretchable light-transmitting layer includes
a plurality of rigid regions having a first elastic modulus, and
a soft region between adjacent rigid regions of the plurality of rigid regions, the soft region having a second elastic modulus that is lower than the first elastic modulus,
the light-emitting element and the first photo-detective element are in at least one rigid region of the plurality of rigid regions, and
the optical structure is in the soft region.

5. The combination sensor of claim 4, wherein the second photo-detective element is in the at least one rigid region or the soft region.

* * * * *